(12) United States Patent
Schorning

(10) Patent No.: US 6,452,731 B1
(45) Date of Patent: Sep. 17, 2002

(54) VIEWING AID FOR DOORS AND WINDOWS

(76) Inventor: Martin Schorning, Eggeweg 16, D-61184, Bielefeld (DE)

( * ) Notice: Subject to any disclaimer, the term of this patent is extended or adjusted under 35 U.S.C. 154(b) by 17 days.

(21) Appl. No.: 09/676,796

(22) Filed: Sep. 29, 2000

(51) Int. Cl.[7] ............ G02B 3/08; G02B 27/10; G02B 5/04
(52) U.S. Cl. ............ 359/742; 359/619; 359/837
(58) Field of Search ............ 359/619, 504, 359/737, 742, 743, 833, 837

(56) References Cited

U.S. PATENT DOCUMENTS

| | | | |
|---|---|---|---|
| 1,678,479 A | 7/1928 | Patten et al. | 359/837 |
| 1,683,951 A | 9/1928 | Buttron | 359/833 |
| 1,883,296 A | 10/1932 | Johnson | 359/837 |
| 2,312,542 A | 3/1943 | Goodman | 359/793 |
| 2,638,810 A | 5/1953 | Berleme | 359/504 |
| 2,708,136 A | 5/1955 | Norris | 296/64 |
| 3,038,756 A | 6/1962 | Heimer | 296/146.2 |
| 3,809,462 A | 5/1974 | Baumgardner et al. | 359/726 |
| 3,972,596 A * | 8/1976 | Baumgardener et al. | 359/737 |
| 4,187,001 A | 2/1980 | Redwitz et al. | 359/726 |
| 4,657,335 A * | 4/1987 | Negishi | 359/742 |
| 4,896,953 A * | 1/1990 | Cobb, Jr. | 359/710 |
| 4,906,082 A * | 3/1990 | Gold | 359/742 |
| 5,280,386 A | 1/1994 | Johnson | 359/509 |
| 2002/0033433 A1 * | 3/2002 | Uhleman et al. | 244/129.3 |

FOREIGN PATENT DOCUMENTS

| | | | | |
|---|---|---|---|---|
| EP | 0 020 006 A1 | 12/1980 | | G02B/9/58 |
| EP | WO 82/04330 A2 | 12/1982 | | G02B/5/08 |
| EP | 0 829 738 A1 | 3/1998 | | G02B/7/18 |
| WO | WO 84/00930 A1 | 3/1984 | | B60R/1/80 |

* cited by examiner

Primary Examiner—Georgia Epps
Assistant Examiner—David N. Spector
(74) Attorney, Agent, or Firm—ProPat, L.L.C.

(57) ABSTRACT

Viewing aids useful for doors and windows, especially in aeroplanes, comprising as an essential element a pane made of a transparent material, which pane has at least one optically active surface comprising a plurality, i.e. at least two, of prisms, or a Fresnel lens, or a combination of both.

7 Claims, 12 Drawing Sheets

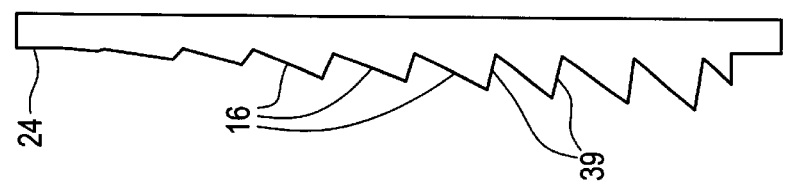
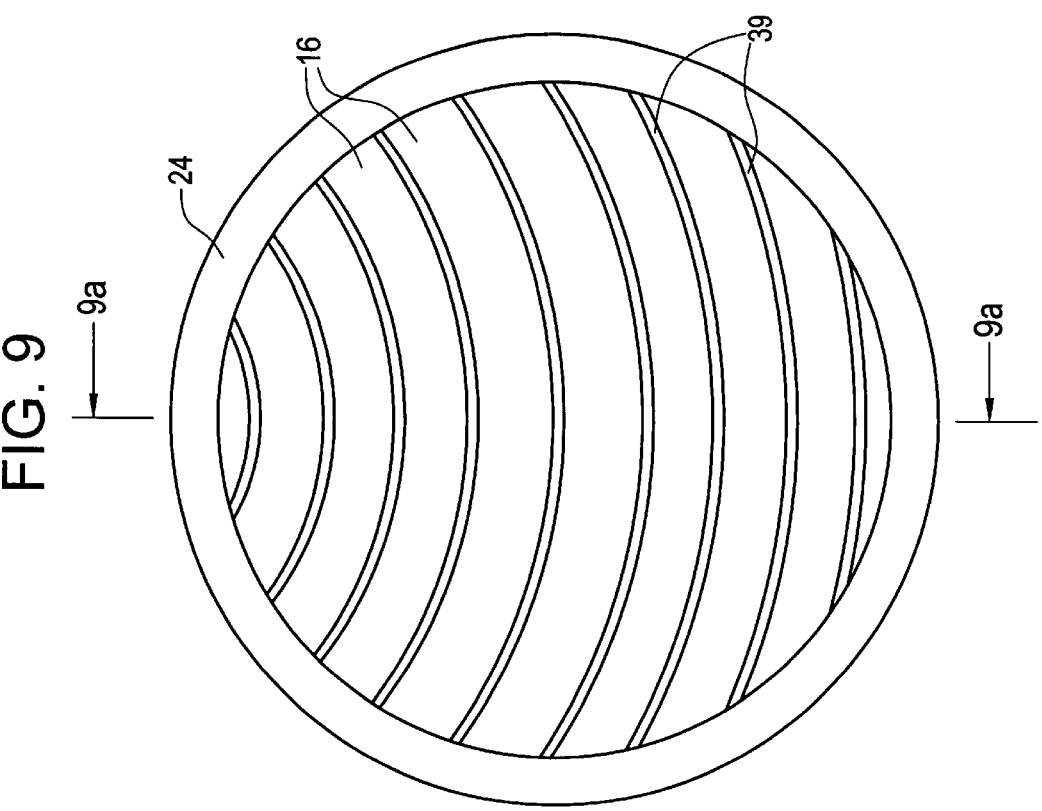

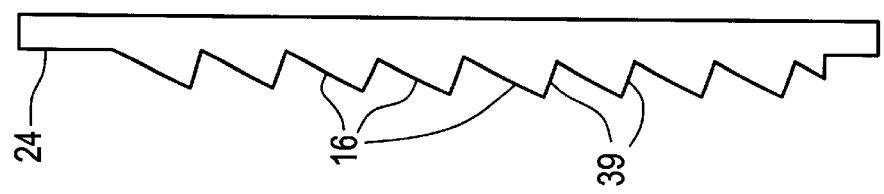
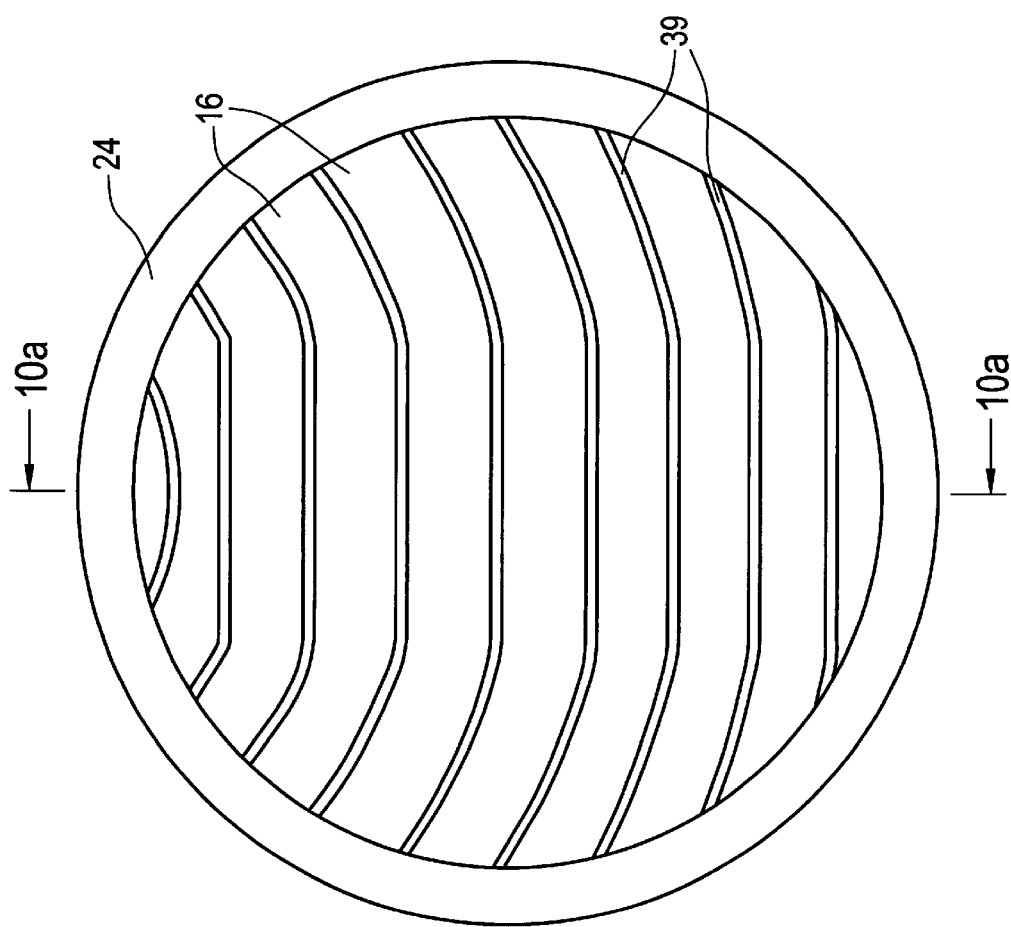

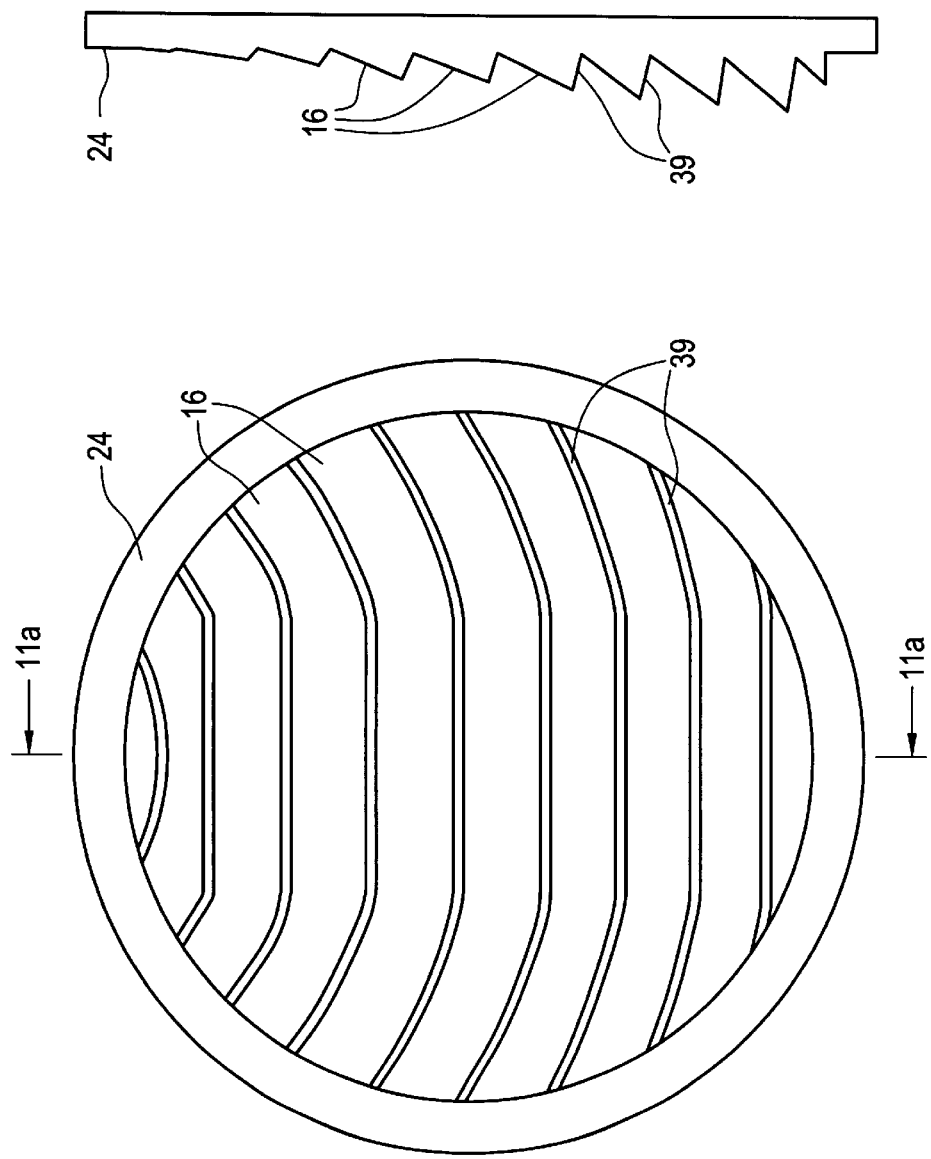

VIEWING AID FOR DOORS AND WINDOWS

BACKGROUND OF THE INVENTION

1. Field of the Invention

The invention relates to viewing aids which are useful for doors and windows, especially for an entrance door of an aeroplane.

2. Description of the Prior Art

U.S. Pat. No. 2,708,136 discloses a prismatic window structure. This is intended for the window adjacent to an aeroplane passenger. Only a single window is provided and the prism is oriented in a horizontal direction to afford the passenger a better forward view. Therefore, the line of sight is essentially parallel to the fuselage. Thus, the proposed structure consists of a single window and the prism affords only a horizontal view for the passenger. The actual prism extends outside of the aeroplane and hence increases the wind resistance.

Various prisms have been proposed in connection with an automobile. An example is U.S. Pat. No. 1,678,479. The prism is disposed near the corner of the automobile windshield to overcome the blind spot created by the corner. To this end, prism strips may be put on the windshield. According to U.S. Pat. No. 1,683,951, an adjustable prism was disposed horizontally near the windshield for observing traffic lights in the car. Similarly, U.S. Pat. No. 1,883,296 discloses a prism which may be tilted in order to better observe traffic lights.

In lieu of a prism, U.S. Pat. No. 3,038,756 suggests the use of two windows in the car, forming an angle with each other.

Furthermore, U.S. Pat. No. 2,312,542 suggests a peep-hole lens combination which permits an observer on one side of a thin door to have a clear view of whatever is present throughout a large range of vision on the other side of the door. However, this lens combination has an insufficient downward angle of view if used in the door of an aeroplane.

U.S. Pat. No. 2,638,810 discloses a door peep observation device wherein a negative lens is provided with a tapered edge and is positioned in a housing with its larger diameter face in abutment with the inner flange portion of the housing. A tube liner of solid kraft paper is adapted to be snugly fitted into the housing and extend from about the inner flange at the front of the housing to the inner edge of the flange of the eye piece holder. By the use of a resilient liner, the leading edge portion thereof may be pressed into the wedge-shaped annular area defined by the tapered edge of the negative lens and the inner wall of the housing. Although this construction provides a tight fit for the negative lens which is relatively tamper proof and water proof, it is not suited for downward observation through a door of an aeroplane.

EP-A 0 829 738 discloses a flat Fresnel mirror for an aeroplane. A large number of ring-like grooves having mutually different diameters are concentrically formed on the back of a planar transparent plastic plate to constitute a Fresnel lens having a concave lens function, a reflecting film is provided to the back so as to provide a convex mirror function to the surface of the transparent plastic plate, and a thin metal sheet is bonded to the reflecting film through an adhesive, thereby constituting a reflecting mirror for an aeroplane cabin. The lamination of the reflecting film and the laminated metal sheet makes the Fresnel lens construction not transparent anymore, therefore it cannot be used as a window component anymore. Also, since the Fresnel lens is concave, it is suited for magnification but not for downward observation through a door of an aeroplane, which requires a convex Fresnel lens.

EP-A 0 020 006 teaches a four-component lens and a display apparatus including a Fresnel lens. The lens structure combines two images that are positioned at a 90 degree angle to each other of which the Fresnel lens is a part. The complicated bulky setup of the structure as described is not suited for a downward observation through a door of an aeroplane.

Finally, EP-A 0 079 895 discloses an aeroplane window comprising a composite window where the inner pane is a prism to provide a good view towards the ground near the aeroplane. The disadvantage of this inner pane with a prism is the bulky design with a weight of about 5 to 6 times compared to the usual thin flat pane with a thickness of approximately 2 mm. Generally, even though it would be preferred, not all doors are supplied with a prism due to the weight restrictions and requirements, which limits the usefulness of the invention. Also, since the prisms and window panes in general are made with non-flame retardant plastic material due to stringent optical requirements, there is an increased danger in case of a fire.

It is frequently desirable to be able to provide a downward angle of view from the window of one or both of the entrance doors of a vehicle such as, for example, those of an aeroplane. This may be desirable for the purpose of observing the outside conditions of the ground close to the aeroplane or the position of the walkway during docking without having to open the doors.

To that end, it has been proposed to enlarge the double panes of the window. However, it has been found that the critical downward angle of view is not thereby appreciably improved.

SUMMARY OF THE INVENTION

The present invention relates to viewing aids useful for doors and windows, especially for an entrance door of an aeroplane. These viewing aids comprise, as an essential element, a pane made of a transparent material, which pane has at least one optically active surface comprising a plurality, i.e. at least two, of prisms, or a Fresnel lens, or a combination of both.

In the context of the present invention, an optically active surface is one that diverts incident parallel light beams in such a way that there is not a mere parallel shift of the light beams, but those light beams that have passed the structure with the optically active surface and the incident light beams enclose an angle which is different from 0 or 180 degrees.

An optically active surface is said to comprise a plurality of prisms if it has, in a side view, or in a cross section parallel to one of the longer axes of the pane, the profile of a saw with at least two saw-tooth sections, and, in a top view, or viewed parallel to the short axis of the pane, the lines that connect all neighbouring peak and valley points form a plurality of parallel straight lines.

An optically active surface is said to form a Fresnel lens if a cross section parallel to one of the longer axes of the pane has the profile of a saw, and, in a top view, the lines that connect all neighbouring peak and valley points form a series of (optionally concentric) circles, or, less preferred, are elliptical or parabolical.

The angle enclosed between the line connecting all valley points which are separated from each other by exactly one peak point and the lines connecting one specific valley point with the peak points immediately adjacent to the said valley point may be the same for both lines, or it may be preferably different on either side of the valley point (the "slope" angle and the "draft" angle). It is possible to keep these angles constant for all prisms formed (all "saw teeth" have the same profile), which provides a uniform deflection of light beams, or it is possible to gradually increase or decrease either the slope of the draft angle, or both, thereby providing a varying angle of light deflection as the incident beams are shifted along the saw profile.

A viewing aid according to the invention comprises at least one such pane with at least one optically active surface, and preferably also at least one pane which has two substantially flat and substantially parallel planes, or surfaces. It is also possible to use an assembly of three panes, the outer panes both having substantially flat and substantially parallel surfaces, and the centre pane having at least one optically active surface.

BRIEF DESCRIPTION OF THE DRAWINGS

FIG. 9 is a schematic view of a section Z as displayed in FIG. 8 of a Fresnel lens where the optical centre of the lens is outside the viewing area;

FIG. 10 is a schematic view of a combination of a array of prisms and a Fresnel lens of which the prism angle does not vary;

FIG. 11 is a schematic view of a combination of a array of prisms and a Fresnel lens of which the prism angle becomes smaller towards the top of the lens;

DETAILED DESCRIPTION OF THE PREFERRED EMBODIMENTS

The viewing aid of the present invention may be used in an entrance door of an aeroplane of the type mentioned above which has a considerable downward view, does not increase the wind resistance and does not affect the weight of the window construction significantly.

The viewing aid according to the present invention may preferentially be in the form of a composite window, similar to that described in EP-A 0 079 895, with an outer pane of a transparent material and an inner pane of a transparent material, said outer pane having two substantially parallel surfaces which may also be substantially plane, and said inner pane having one surface which is also preferentially plane, and a second surface, at least a part of which forms a Fresnel lens or an array of prisms, or a combination thereof, one of the surfaces of the inner pane facing said outer pane at a close distance and with means for sealing at least said outer pane substantially air-tight to the door. This construction allows viewing the outside, e.g. the ambient of an aeroplane in a predetermined direction at a small angle to the fuselage. It may be used on all entrance doors (including the front and aft entrance doors).

The optically active surface of the inner pane has at least a portion forming a prism array or Fresnel lens oriented to afford a view outside the aeroplane in a predetermined direction. Preferably the prism array or Fresnel lens is oriented to afford a view substantially downward of the aeroplane. Further, the apical angle of the prism array or Fresnel lens may be adjusted to suit different requirements; for example, the prism array may be aligned for the forward door so that the line of sight is directed slightly rearwardly and for the aft doors the line of sight is directed somewhat forwardly. This will improve the viewing angle toward the engines and wing fuel cell area.

It is also frequently desirable to be able to inspect one limited section of, e.g. an aeroplane, in greater detail, while at the same time keeping the option to view a larger area of the said aeroplane with less detail. Such requirements can be solved using the viewing aid of the present invention, with an optically active surface having a central area forming an array of prisms, said section being complemented on at least one side by a section of a Fresnel lens structure. A negative Fresnel lens offers the opportunity to view a larger section of the aeroplane with less detail.

DETAILED DESCRIPTION OF THE DRAWINGS

Figure 1:
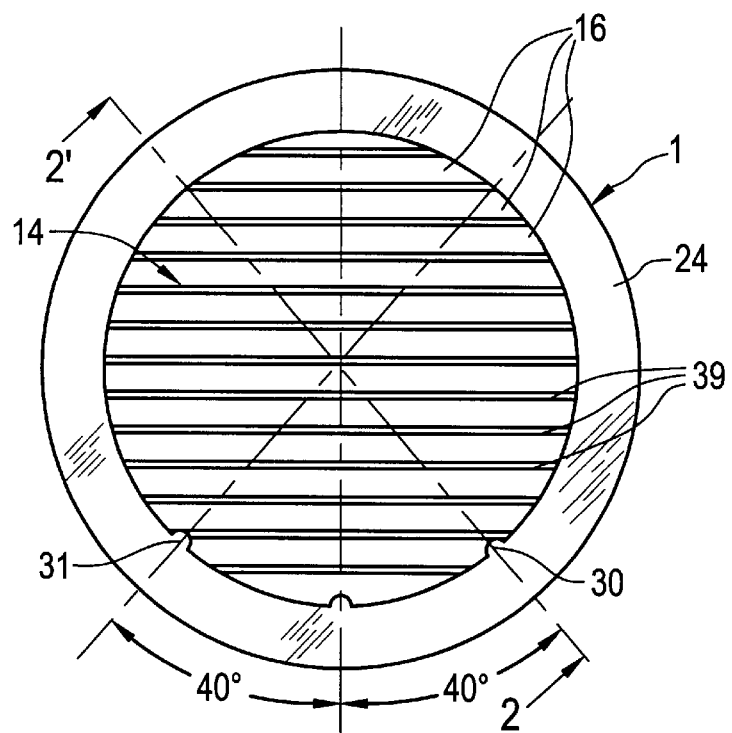
FIG. 1 is a front view of a pane with an optically active surface.

In FIG. 1, a front, or top view of a pane 1 comprising an optically active surface on one side of the said pane is shown. The pane 1 has a circular rim 24 which does not comprise any structure on either side, the said rim constituting two substantially flat and substantially parallel annular areas which can be used to fasten the pane in a frame.

In the context of the present invention, substantially flat means such surfaces that have been cast or machined to show no major unevenness, i.e. no surface irregularities of more than 5%, preferably not more that 2%, of elongation difference between any two points of the surface with a distance of less than 5 mm in any direction, and a plane parallel to the two longer axes of the said pane. Substantially parallel is used for straight lines or planes where the vertical distance (shortest distance) does not vary by more than 5%, preferably not more than 2%, between any two points limiting such vertical distance between the lines or the planes.

The pane 1 has also a circular optically active surface 14 which forms an array of prismatic structures, having two planes 16 (the slope facet) and 39 (the draft facet) that can have different slopes each, with the inclination of the slope of plane 16 preferentially being smaller than the inclination of the slope of plane 39, both with respect to the plane of the pane 1 which in this figure is parallel to the plane of the paper in the drawing.

It is conventional practice to provide two spaced plane panes for aeroplane windows. This will minimize the effects of the pressure difference between the ambient atmosphere and the interior of the aeroplane. Further, the spacing between the panes serves as thermal insulation between the temperatures prevailing inside and outside of the aeroplane.

Figure 2:
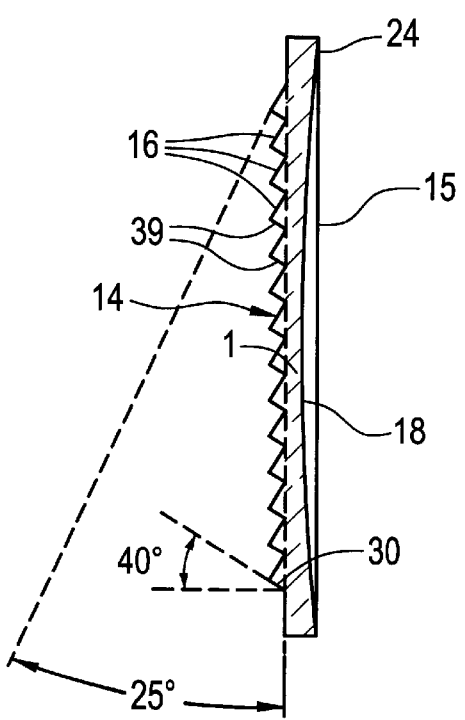
FIG. 2 is a sectional view taken on line 2–2' of FIG. 1.

FIG. 2 shows a cross-section of the pane of FIG. 1 along the line 2–2'. The different slopes in facets 16 and 39 form the "saw-tooth" profile of the prism array of the optically active surface 14. The slope of the steeper side of the prism 39 is 40 degrees in this figure. The other surface 15 of the pane 1 is substantially flat, or it may, as shown in this FIG. 2, be slightly concave (surface 18) and thus act as a concave or negative lens.

The lens with the surface 18 has a similar diameter as that of the optically active surface 14. By way of example, the diameter of the surface 14 may be 17.1 cm and the distance between the surface 14 and the outer rim of the pane 1 may be 2.5 mm. The concave surface 18 may, for example, have a radius of curvature of 81 cm. This lens radius may be modified according to particular requirements. Preferably the optically active surface 14, and the concave lens are a monolithic structure. Moreover, it is also possible to make the lens and the optically active surface 14 comprising the plurality of prisms with facets 16 and 39 separately and to optically join them subsequently.

As shown particularly in FIGS. 1 and 2, there may be provided a suitable alignment means in the inner region of the pane 1, near the optically active surface 14. This may, for example, consist of two alignment holes 30 and 31 in the inner optically active surface region 14. As shown by the 40 degree angle in FIG. 1, the array of prisms for the forward door may be aligned 40 degree aft from the vertical to provide the special view angle needed. On the other hand, the array of prisms for the aft door may be aligned 40 degrees forward from the vertical. As explained before, this alignment angle has been selected to improve the viewing angle toward the engine and wing fuel cell areas. However, it will be understood that the array of prisms with facets 16 and 39 may be aligned in any desired direction.

Figure 3:
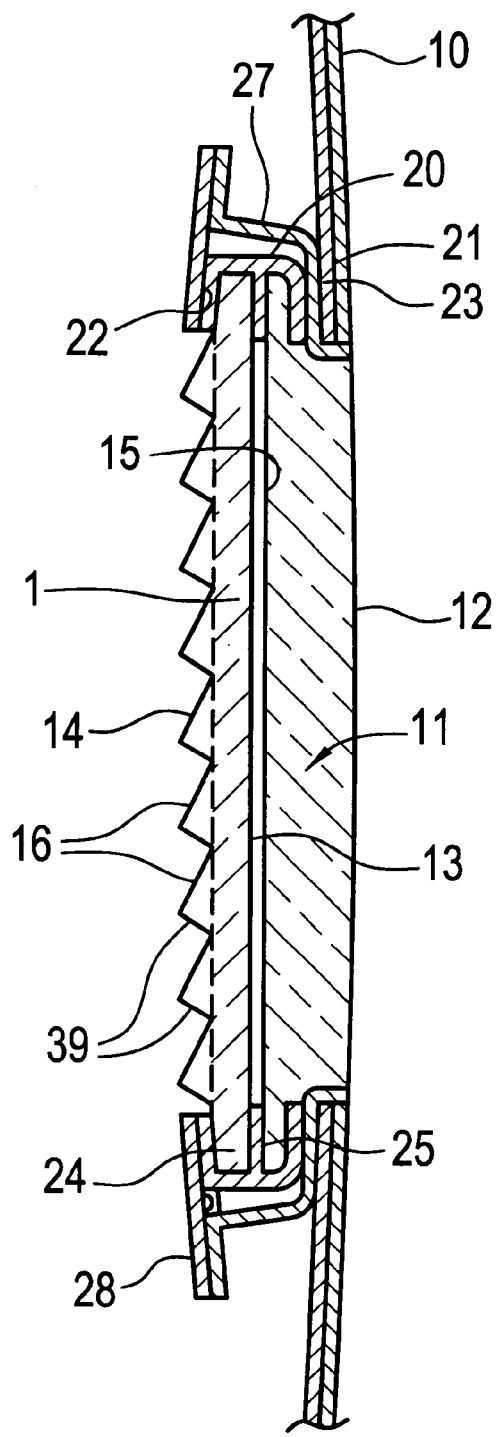
FIG. 3 is a sectional view of the window of the entrance door comprising a viewing aid according to the invention, similar to that of FIG. 2 but illustrating a portion of the door and the sealing means for the composite window.

FIG. 3 is the cross-sectional view of a viewing aid comprising a pane 1 with an optically active surface 14 as shown in FIG. 2, combined with a substantially flat pane 11, thus constituting a window construction located in an aeroplane or car body 10. The window construction is sealed in the aeroplane or car body with a seal 20 of a suitable material such as rubber or plastic. The seal 20 has the form of the window construction and is circular in this case. It has a central portion 21 for spacing the two panes 11 and 1 and two outer portions 22 and 23 surrounding the two panes 11 and 1 at their outer rims 24 and 25. The composite window is held together by a plurality of retainer clips 27 which are secured to a metal frame 28. This can also be seen in FIG. 4. The inner pane 1 comprising the optically active surface 14 is here denoted by a, a spacer ring b is fixed in a circular frame c, and a substantially flat pane d comprising an inner portion 11 and a rim 25, the thickness of which is smaller than that of the inner portion, the elevated part of d facing the inner pane a.

Figure 4:
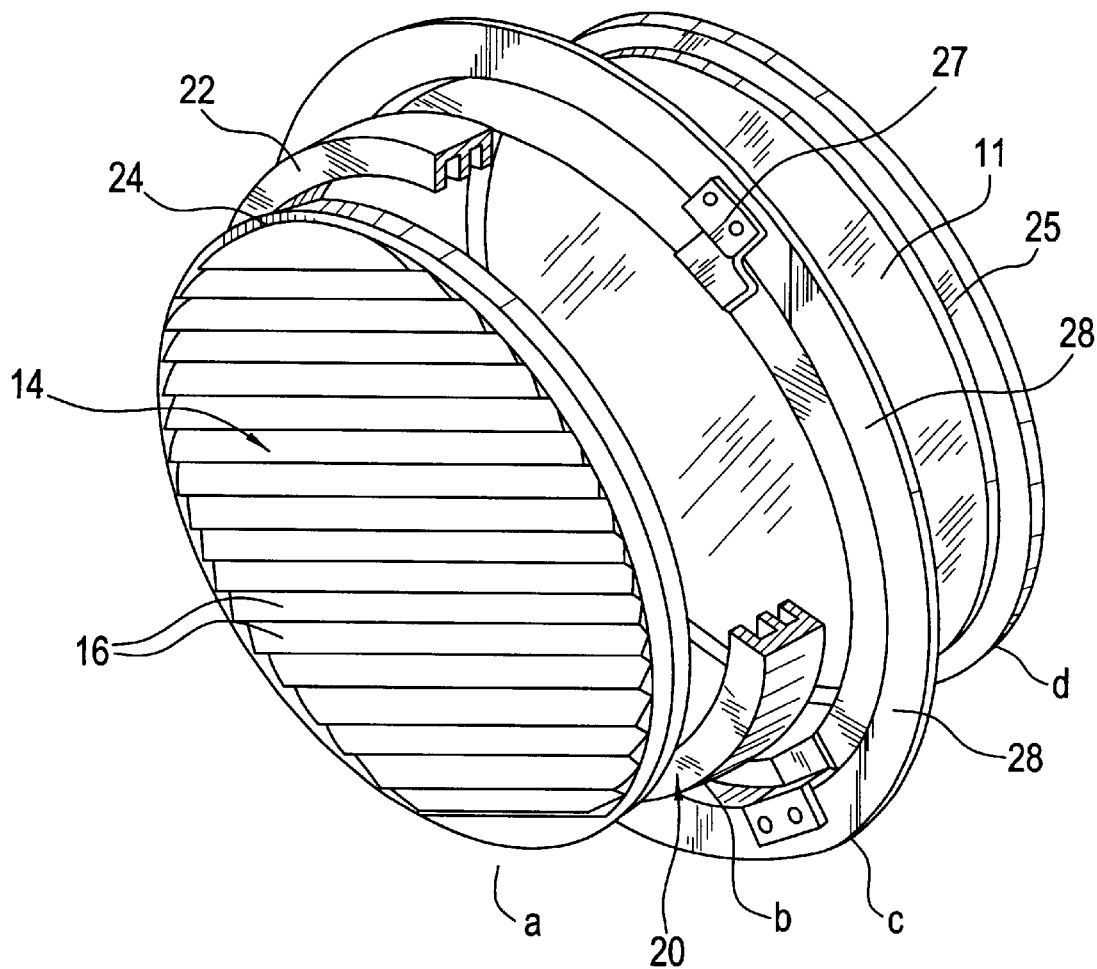
FIG. 4 is an exploded view of the inner pane, the outer pane, the seal and the metal frame.

The composite window of FIG. 4 may be placed in a door which may be the forward or aft entrance door of a vehicle such as, for example, an aeroplane. The height of the centre of the window above the cabin floor is approximately 1000 mm. The plane of the window in an aeroplane is usually at an angle of 25 degrees with the normal on (=line perpendicular to) the cabin floor. The line of sight (35 in FIG. 5) typically encloses an angle of 50 degrees (=2 ×25 degrees) with the normal of the window plane line perpendicular to the plane of the window). By way of an example, at a distance of 500 mm from the window, the preferred, or optimum, observation height may be 1250 mm; at a distance of 1000 mm from the window, the preferred, or optimum, observation height may be 1450 mm.

Figure 5:
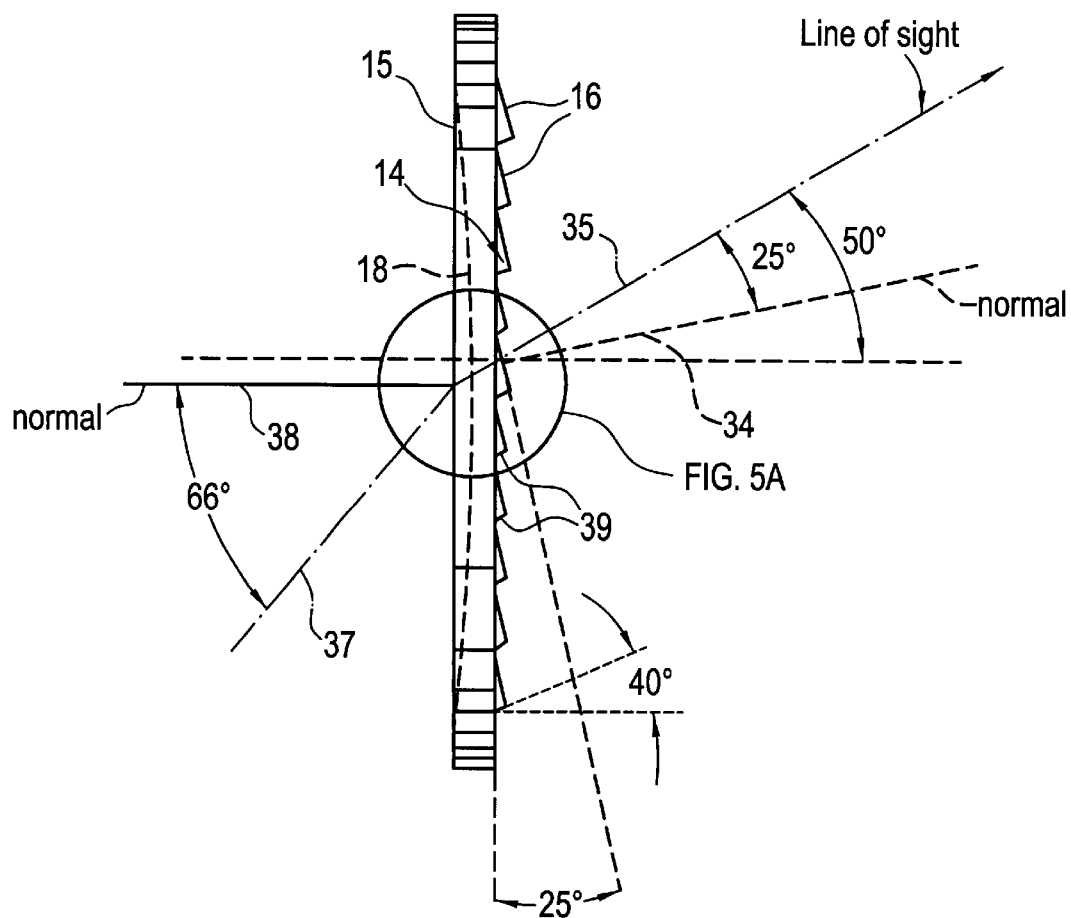
FIG. 5 is a schematic view similar to that of FIG. 2 but showing the optical path for a line of sight and respective angles.
Figure 5A:
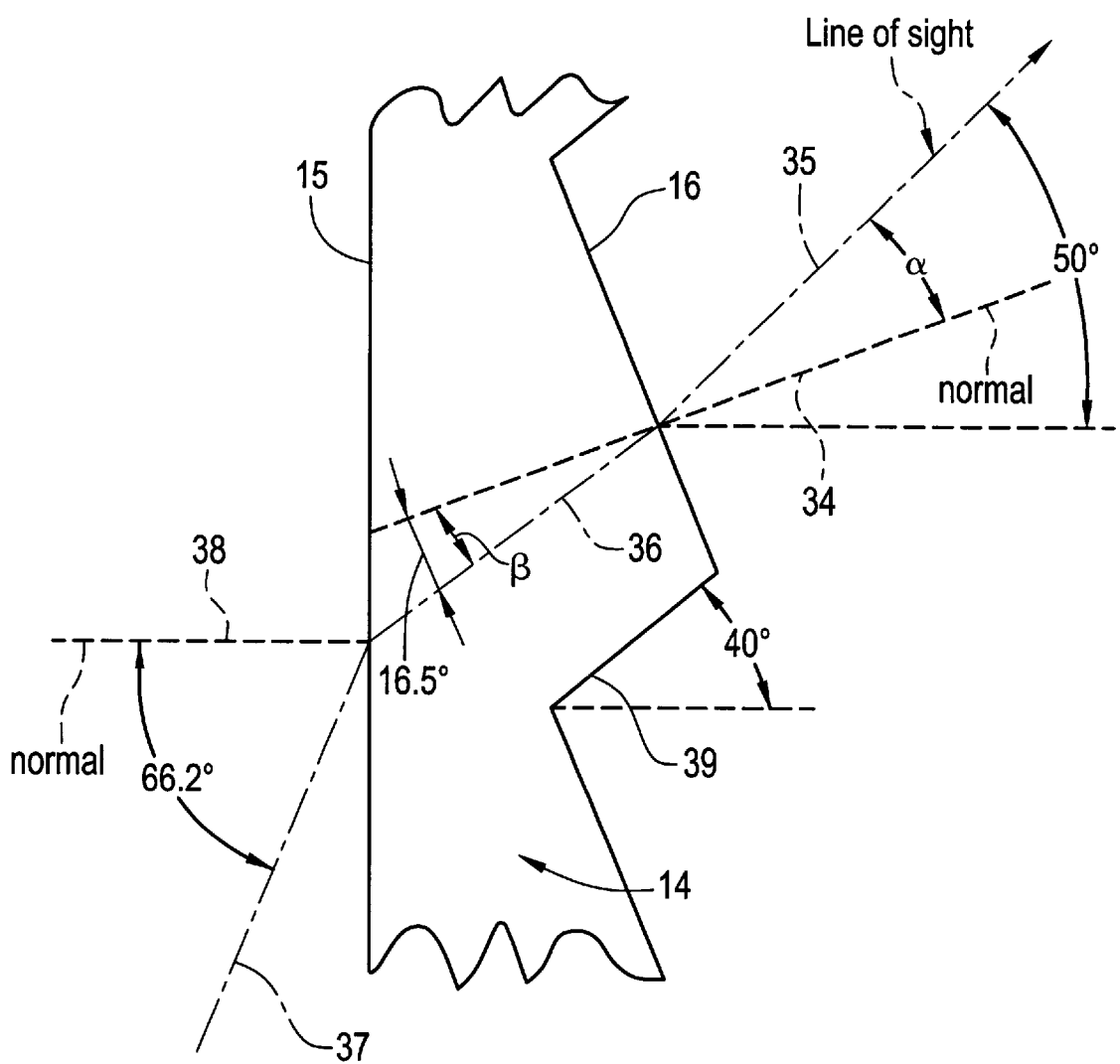
FIG. 5a is an enlarged section of the optically active surface shown in FIG. 5, and illustrates the light path

The mode of operation of the optically active surface 14 which comprises an array of prisms may now be explained in connection with FIG. 5 and FIG. 5a which is an enlarged portion of FIG. 5, to which reference is now made. As shown in the FIG. 2, the angle of the half prisms 16 may, by way of example, be 25 degrees. For purpose of clarity, there is only reference to one prism of the prism array. The normal to the facet 16 of the prism is shown by the line 34 and the line of sight is indicated by the dotted line 35. The line of sight 35 forms an angle α with the normal and this angle may, for example, be 25 degrees, as shown in FIG. 5. A light ray travelling along line 35 continues into the prism facet 16 as shown by line 36. Line 36 forms an angle β with the normal 34. This angle β is 16.5 degrees in this example. According to Snell's law, the ratio of the sines of the angles α and β is equal to the ratio of the indices of refraction of air and the material of prism 16. Accordingly, in the case illustrated, sin (25 degrees) divided by sin (16.5 degrees) equals 0.423/0.284 which in turn is 1.49. Since the index of refraction of air is 1, 1.49 is the refractive index of the material of the prism with facets 16 and 39, such as acrylic transparent plastic. The refractive indices of glass may vary between 1.5 and 1.9, while the index of refraction of polycarbonate is 1.58. It will be understood that any optically transparent material having different indices of refraction may be used for the prism with facets 16 and 39, such as various kinds of glass, or transparent plastic substances, and the like. The corresponding angles can be readily determined from Snell's law.

The light ray 36 leaves the pane via the surface 15, as shown by the light ray 37. The exiting angle, total deviation provided by the prism facet 16 and the (flat) surface 15, measured between the normal 38 to the surface 15 and the exiting light ray 37 is 66.2 degrees, and the additional deviation provided by the negative lens defined by the (concave) surface 18 is an additional 2.5 degrees, making a total of 68.7 degrees. However, the actual deviation, due to the prism facet 16, is only 16.2 degrees, or 68.7 degrees minus 50 degrees minus 2.5 degrees.

Next to the angle of the half prisms 16, also the angle of the draft facet 39 of the prisms is important for the optical properties of the prism array. The draft angle, which is in this case 40 degrees, is preferably as close as possible to the most used or preferred line of sight angle to minimize the disturbance of the overall picture. The angle of 25 degrees for the smaller slope of the array of prisms and the draft angle of 40 degree, as in the figures, is given only be way of example and my be varied in accordance with requirements, the index of refraction of the array of prisms and the desired downward viewing angle.

Thus, when the true index of refraction of the array of prisms 16 is increased due to a different material, the deviation due to the array prism is also increased. As the prism angle, the optical angle, is increased, the angle of the line of sight 35 may also change.

Figure 6:
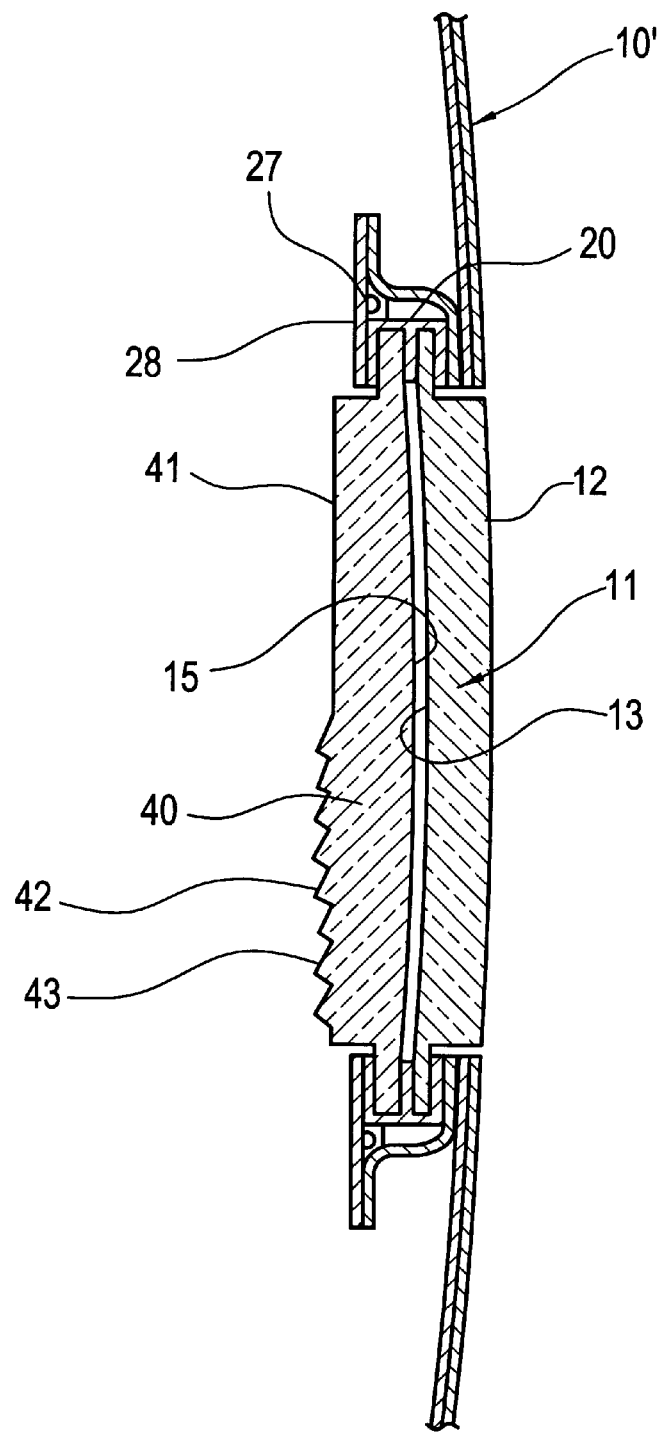
FIG. 6 is a sectional view similar to that of FIG. 3 but showing the inner pane being partially flat and partly in the shape of a prism array.

As previously indicated, it is not necessary that the array of prisms 16 extend over the entire surface of the inner optically active surface 14 of pane 1. This is illustrated in FIG. 6, to which reference is now made. Here an inner pane 40 has an upper surface 41 which is plane and parallel to the surface 15. However, the lower surface 42 forms a prism array 43. Otherwise the embodiment of FIG. 6 operates in the same manner as that of FIG. 3, for example.

Figure 7:
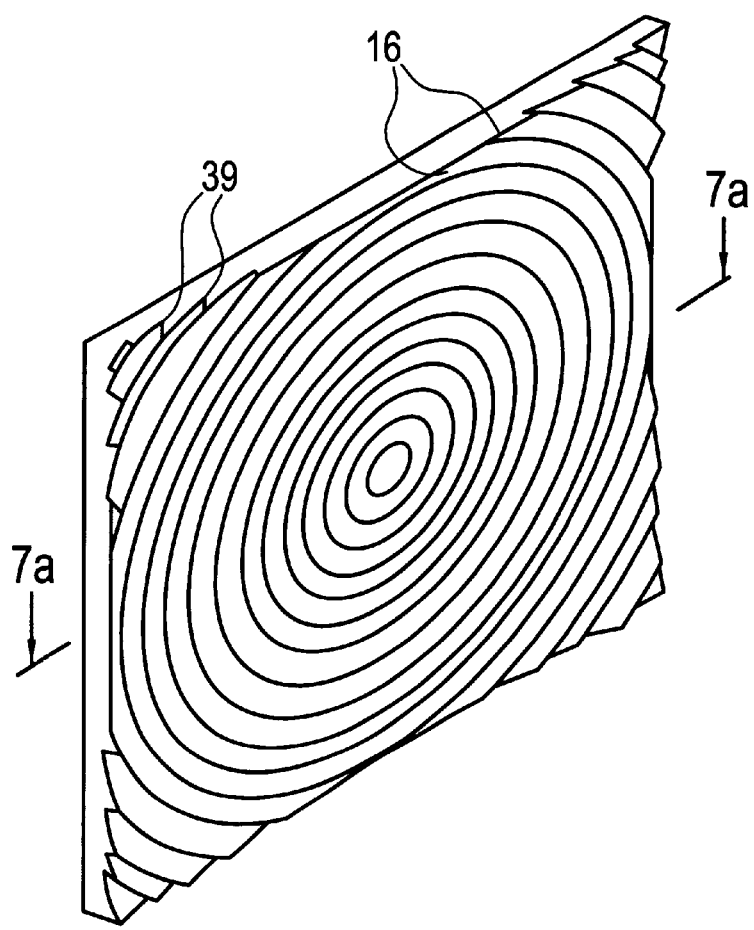
FIG. 7 shows a top-side view and a cross section of a negative Fresnel lens.
Figure 7A:
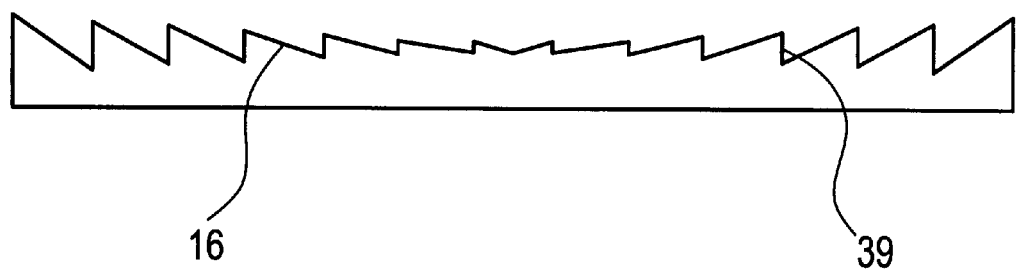

Instead of using an array of prisms, a Fresnel lens or a section of a Fresnel lens can be used. A Fresnel lens is an array of prisms oriented in concentric circles with varying draft surface angles as shown is FIG. 7. A cross section of the Fresnel lens is shown in FIG. 7a. For an optimized downward view with a minimum distortion, only a section of a Fresnel lens will be required, like shown as a top view in FIG. 8. The smallest concentric rings will be oriented upwards for an optimized downward view. A side effect of the use of a Fresnel lens is the negative magnification of the lens; objects will appear smaller then they are. On the other hand, the negative magnification can be an advantage, since a larger area is visible.

Figure 8:
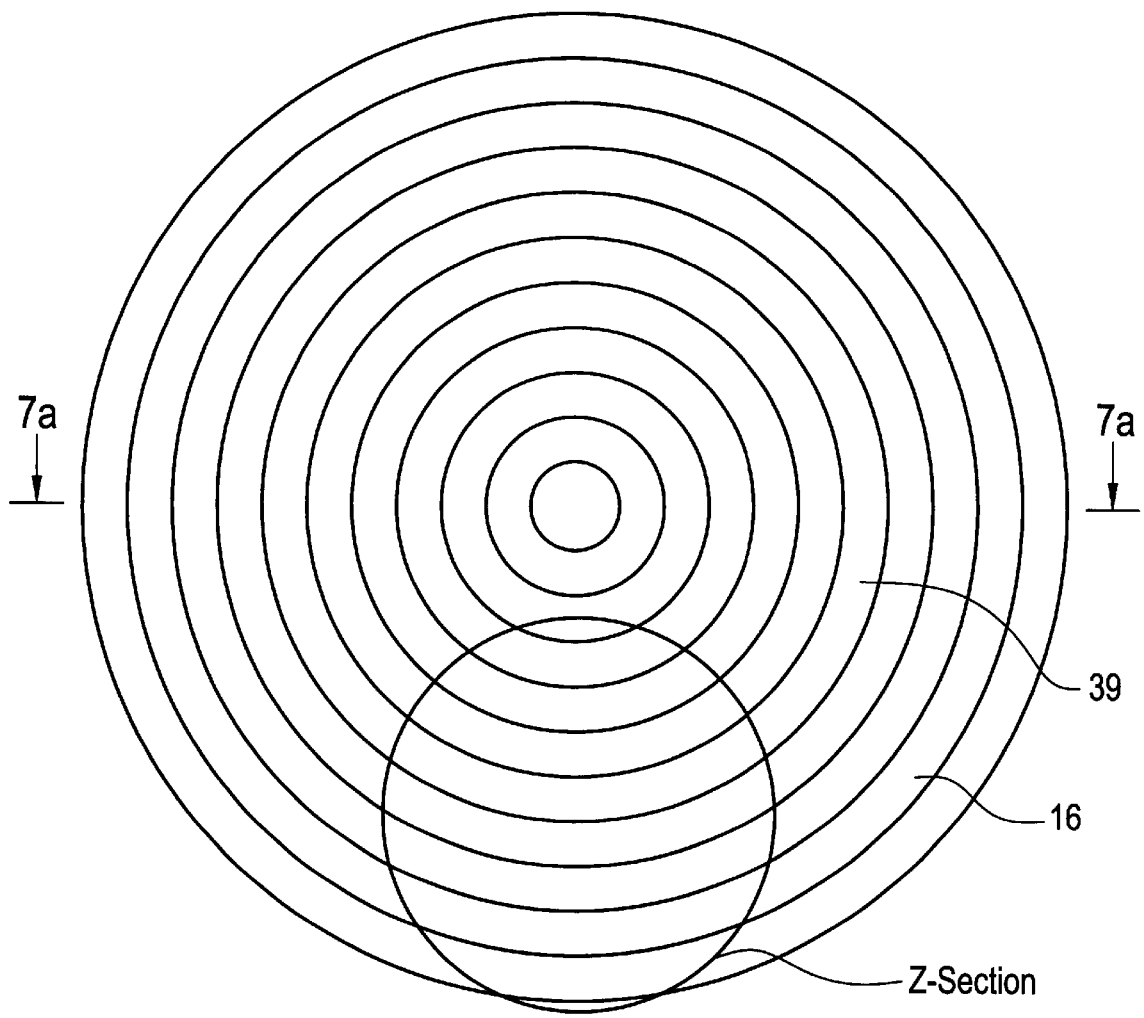
FIG. 8 shows a schematic front view of a negative Fresnel lens.

FIG. 9 shows a viewing aid similar to that of FIG. 1, where the plurality of prisms constituting the optically active surface 14 has been replaced with a section of a Fresnel lens, like that designated as "Z-Section" in FIG. 8. A circular flat rim is provided to facilitate the fixing of such viewing aid in a composite window. FIG. 10 shows a combination of different types of optically active surfaces, in this case a centre section comprising a plurality of prisms, with constant slope angles of the facets, as those of FIG. 1, and two lateral sections comprising Fresnel lens structures. Such structure provides an undistorted (neither magnification nor contraction) view in the centre section, and a negative magnification or contraction in the lateral sections. A similar structure, yet with the slope angle of facet 16 increasing towards the lower part of the prism array centre section, and lateral Fresnel lens sections as in FIG. 10, is shown in FIG. 11.

Figure 12:
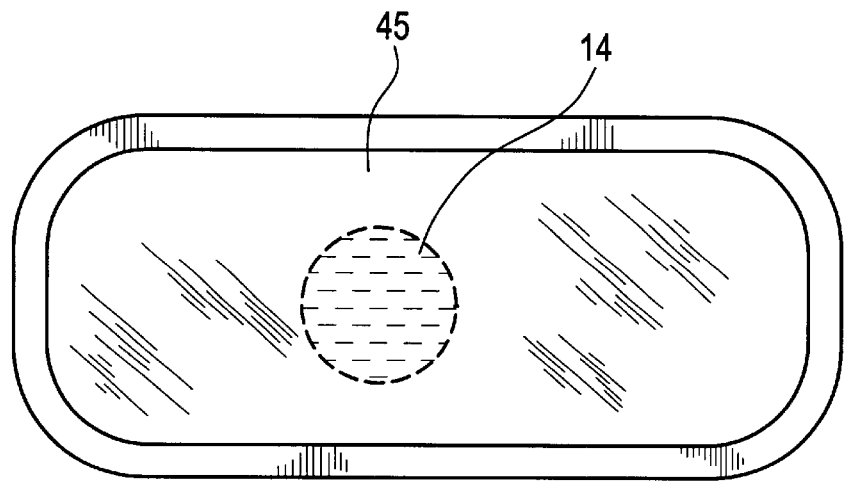
FIG. 12 is a front view of a modified window of a substantially rectangular outline comprising a viewing aid according to the invention.

Instead of using a composite window with a circular outline, comprising a viewing aid of the present invention, it is also feasible to provide a window with a substantially rectangular outline. This is shown in FIG. 12 to which reference is now made, where the composite window 45 is elongated and generally forms an oval, or a rectangle with rounded corners. The rectangular structure 45, with rounded angles, may comprise a single prism array section, such as that of FIG. 1, or a flat section and a prism array section, such as that of FIG. 6, or a Fresnel lens structure such as that of FIG. 9, or a combination of Fresnel lens and prism array sections, such as those of FIGS. 10 and 11. Needless to say, the combined structures of FIGS. 10 and 11 may also be further combined with flat sections as the upper zone in FIG. 6. By way of example, a circular prism array in a section of window 45 is shown in FIG. 12.

Figure 13:
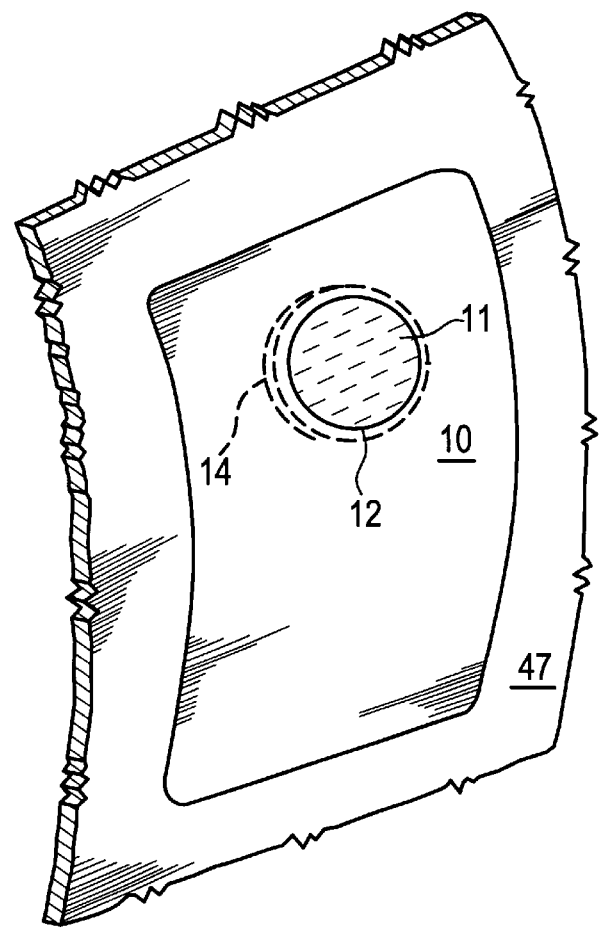
FIG. 13 is a perspective view indicating an installation relationship of an example of an entrance door comprising a viewing aid according to the invention.

The present invention also relates to a composite window suitable for the entrance doors of a vehicle such as those of an aeroplane. The window includes an outer pane which may simply be a glass plate, or other optically transparent plate. The inner pane which is spaced from the outer pane, includes an array of prisms or a Fresnel lens on the inside of the vehicle. The array of prisms or Fresnel lens may be adjusted or aligned so that the line of sight is not necessarily a beam or straight out (and downward), but in a predetermined forward or aft direction. This is achieved by adjusting the viewing aid such that the line of the highest gradient in the prism arrays (or the Fresnel lens) is not parallel to a vertical line (with regard to the vehicle), but encloses an angle which is higher than 1 degree, and smaller than 89 degrees. Preferably, this angle is between 10 and 80 degrees, and more preferably, between 20 and 70 degrees. Additionally, the outer pane may be provided with a concave surface forming a concave, or negative, lens. This lens enhances the optical deviation afforded by the array of prisms. The composite window of the invention may be fitted into any vehicle door in the manner indicated by FIG. 13 in which an entrance door 10 is shown closed into the fuselage wall 47 of an aeroplane. The composite window is seen to include the outer pane 11 with its external surface 12 disposed essentially flush with that of the fuselage wall 47. The inner pane with a prism array configuration is indicated at 14.

What is claimed is:

1. Viewing aids useful for doors and windows, comprising as an essential element a pane made of a transparent material, which pane has at least one optically active surface comprising a plurality, i.e. at least two, of prisms, or a combination thereof with a Fresnel lens, wherein at least one of the slope and draft angles of the said prisms vary for neighbouring prisms.

2. The viewing aids as claimed in claim 1, wherein at least one of the slope and draft angles of the said prisms gradually increase.

3. The viewing aids as claimed in claim 2, comprising a pane having at least one section with a plurality of prisms, and at least one section with a Fresnel lens structure.

4. The viewing aids as claimed in claim 3, having one section with a plurality of prisms, and two sections with a Fresnel lens structure.

5. The viewing aids as claimed in any of claims 1 through 4, wherein the line of the highest gradient in the prism array embraces an angle with a vertical line of more than 1 and less that 89 degrees.

6. Windows for vehicles comprising a viewing aid as claimed in any of claims 1 through 4.

7. Windows for aeroplanes comprising a viewing aid as claimed in any of claims 1 through 4.

* * * * *